United States Patent
Togasawa

(10) Patent No.: US 7,690,367 B2
(45) Date of Patent: Apr. 6, 2010

(54) INTERNAL COMBUSTION ENGINE AND VEHICLE HAVING THE INTERNAL COMBUSTION ENGINE

(75) Inventor: Ryuuta Togasawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/044,812

(22) Filed: Mar. 7, 2008

(65) Prior Publication Data

US 2008/0223348 A1 Sep. 18, 2008

(30) Foreign Application Priority Data

Mar. 13, 2007 (JP) .............................. 2007-063074

(51) Int. Cl.
*F02F 1/42* (2006.01)

(52) U.S. Cl. ................ 123/572; 123/193.5; 123/195 C; 123/41.86

(58) Field of Classification Search ................ 123/572, 123/573, 574, 195 C, 193.5, 198 E, 41.86
See application file for complete search history.

(56) References Cited

U.S. PATENT DOCUMENTS 4,721,090 A * 1/1988 Kato .......................... 123/572
4,993,375 A * 2/1991 Akihiko .................... 123/90.38
5,123,385 A * 6/1992 Sado et al. ................. 123/193.5
5,129,371 A * 7/1992 Rosalik, Jr. ............... 123/90.38
5,323,740 A * 6/1994 Daily et al. ............... 123/90.38
6,443,136 B1 * 9/2002 Suganami et al. ........... 123/572
2005/0005921 A1 * 1/2005 Ikeda et al. ................. 123/572

FOREIGN PATENT DOCUMENTS

JP          7-99087         10/1995
JP       2006283594 A    * 10/2006

* cited by examiner

*Primary Examiner*—Michael Cuff
*Assistant Examiner*—Hung Q Nguyen
(74) *Attorney, Agent, or Firm*—Keating & Bennett, LLP

(57) ABSTRACT

An engine (internal combustion engine), in accordance with an embodiment, includes: a cylinder head disposed above a crankcase; a cylinder head cover attached to cover an upper side of the cylinder head; and an ignition plug provided with a plug part inserted into the cylinder head and a plug cap disposed outside the cylinder head cover. The cylinder head cover includes a gas passage formed in such a U-shape as to surround the plug cap of the ignition plug as viewed from an insertion side of the ignition plug, the gas passage allowing fuel gas (blow-by gas) containing oil to flow in from the crankcase.

16 Claims, 10 Drawing Sheets

INTERNAL COMBUSTION ENGINE AND VEHICLE HAVING THE INTERNAL COMBUSTION ENGINE

CROSS-REFERENCE TO RELATED APPLICATIONS

This application is related to and claims priority to Japanese Patent Application No. 2007-063074, filed on Mar. 13, 2007, the entire contents of which is incorporated herein by reference in its entirety.

TECHNICAL FIELD

The present invention relates generally to an internal combustion engine and a vehicle including the internal combustion engine, and more specifically to an internal combustion engine including a cylinder head cover and a vehicle including the internal combustion engine.

BACKGROUND

Conventionally, internal combustion engines having a cylinder head cover are known. For example, Japanese Patent Document JP-B-Hei 7-99087 discloses an internal combustion engine provided with a cylinder head cover formed with: a plurality of ignition plug insertion holes disposed in a straight line in a predetermined direction; a chain case extending in a direction perpendicular to the predetermined direction in which the plurality of ignition plug insertion holes are arranged and spaced a predetermined distance apart from the plurality of ignition plug insertion holes; and an L-shaped gas passage disposed along one longitudinal side and one lateral side of a rectangular region where the plurality of ignition plug insertion holes are disposed. In this internal combustion engine, the L-shaped gas passage is provided to separate oil from blow-by gas (fuel gas containing oil) when blow-by gas with oil mixed therein flows therethrough. For this internal combustion engine example, a fresh air passage for taking in fresh air from the outside of the internal combustion engine and allowing the fresh air to flow therethrough is provided, besides the L-shaped gas passage, on the other longitudinal side of the rectangular region where the plurality of ignition plug insertion holes are disposed.

In the internal combustion engine disclosed in the above example, blow-by gas (fuel gas containing oil) flows through the L-shaped gas passage disposed along one longitudinal side and one lateral side of the rectangular region where the plurality of ignition plug insertion holes are disposed, while the fresh air passage is formed on the other longitudinal side of the rectangular region where the plurality of ignition plug insertion holes are disposed. In other words, only one longitudinal side, but not the other longitudinal side, of the rectangular region of the cylinder head cover where the plurality of ignition plug insertion holes are disposed is used for blow-by gas to flow through, and it is therefore difficult to provide this internal combustion engine with a sufficiently long passage for separating oil from blow-by gas.

SUMMARY

The present invention, in accordance with one or more embodiments, addresses the foregoing problem, and therefore for an embodiment provides an internal combustion engine with a sufficiently long gas passage for separating oil from fuel gas containing oil and a vehicle including the internal combustion engine.

In accordance with an embodiment, a first aspect of the present invention is directed to an internal combustion engine including: a crankcase; a cylinder head disposed above the crankcase; a cylinder head cover attached to cover an upper side of the cylinder head; and an ignition plug provided with a plug part inserted into the cylinder head and a plug cap covering the plug part and disposed outside the cylinder head cover, in which the cylinder head cover has a gas passage formed in such a U-shape as to surround the plug cap of the ignition plug as viewed from an insertion side of the ignition plug, the gas passage allowing fuel gas containing oil to flow in from the crankcase.

According to the internal combustion engine of the first aspect in accordance with an embodiment, the cylinder head cover is provided with the gas passage formed in such a U-shape as to surround the plug cap of the ignition plug as viewed from the insertion side of the ignition plug as described above. Therefore, the gas passage can be formed using a larger part of the cylinder head cover as viewed from the insertion side of the ignition plug than the case where the gas passage was formed in an L-shape as viewed from the insertion side of the ignition plug. This increases the length of the gas passage. As a result, the cylinder head cover can be provided with a gas passage having a length long enough to separate oil from fuel gas containing oil.

In the internal combustion engine of the first aspect, in accordance with an embodiment, the cylinder head cover further has a chain case part provided at an end thereof to extend in a predetermined direction as viewed from the insertion side of the ignition plug, the chain case part covering an area above a cam chain; the gas passage includes: a first passage and a second passage spaced a predetermined gap apart from each other so as to interpose the ignition plug therebetween; and a third passage formed adjacent to the chain case part to couple respective parts of the first passage and the second passage on a side of the chain case part; the first passage and the second passage extend in a direction crossing the predetermined direction; and the third passage is configured to extend in the predetermined direction. According to this configuration, it is easy to provide the cylinder head cover with a gas passage in a U-shape as viewed from the insertion side of the ignition plug.

The internal combustion engine in which the gas passage includes the first passage and the second passage and the third passage, in accordance with an embodiment, further includes a gas flow-in port provided on a side opposite to the chain case part to allow the fuel gas containing oil to flow into the first passage, and the gas passage of the cylinder head cover is disposed to be inclined downward toward the gas flow-in port. According to this configuration, oil separated from the blow-by gas inside the gas passage is allowed to flow toward the first passage, and be discharged to the outside of the gas passage from the gas flow-in port which is provided on a side opposite to the chain case part.

The internal combustion engine in which the gas passage includes the first passage and the second passage and the third passage, in accordance with an embodiment, further includes a gas flow-in port provided on a side of the first passage opposite to the chain case part to allow the fuel gas containing oil to flow into the first passage, and the gas flow-in port is provided with a shield part for restraining oil splashed therebelow from entering into the first passage. According to this configuration, the shield part can easily restrain oil splashed below the gas flow-in port from entering into the first passage from the gas flow-in port.

The internal combustion engine in which the gas flow-in port is provided with the shield part, in accordance with an embodiment, further includes a plate member provided at a lower side of the cylinder head cover, and a bottom of the gas passage is constituted by the plate member. According to this configuration, the inside of the gas passage can be cleaned easily after detaching the plate member.

In this case, in accordance with an embodiment, the shield part of the gas flow-in port is integrally formed with the plate member. This configuration restrains an increase in the number of parts due to providing the shield part.

The internal combustion engine in which the gas flow-in port is provided with the shield part, in accordance with an embodiment, further includes: a cam part disposed below the cylinder head cover to operate an intake valve and an exhaust valve; and an umbrella part provided between the cam part and the gas flow-in port to restrain oil from being splashed upward as the cam part rotates. According to this configuration, not only the shield part but also the umbrella part can restrain oil splashed upward as the cam part rotates from entering into the first passage from the gas flow-in port, further restraining oil from entering into the first passage.

In the internal combustion engine of the first aspect, in accordance with an embodiment, the gas passage of the cylinder head cover has a plurality of partition walls provided to project inside the gas passage. According to this configuration, the plurality of partition walls can restrain an increase in the flow rate of fuel gas containing oil flowing through the inside of the gas passage, increasing the time for the fuel gas containing oil to pass through the gas passage. This allows effective separation of oil from the fuel gas containing oil.

In this case, in accordance with an embodiment, the plurality of partition walls are integrally formed with the cylinder head cover. According to this configuration, the plurality of partition walls can be formed in the gas passage of the cylinder head cover without increasing the number of parts.

A second aspect, in accordance with an embodiment of the present invention, is directed to a vehicle including the internal combustion engine with any one of the configurations described above. According to this configuration, it is possible to obtain a vehicle provided with an internal combustion engine in which a gas passage having a length long enough to separate oil from fuel gas containing oil can be provided.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
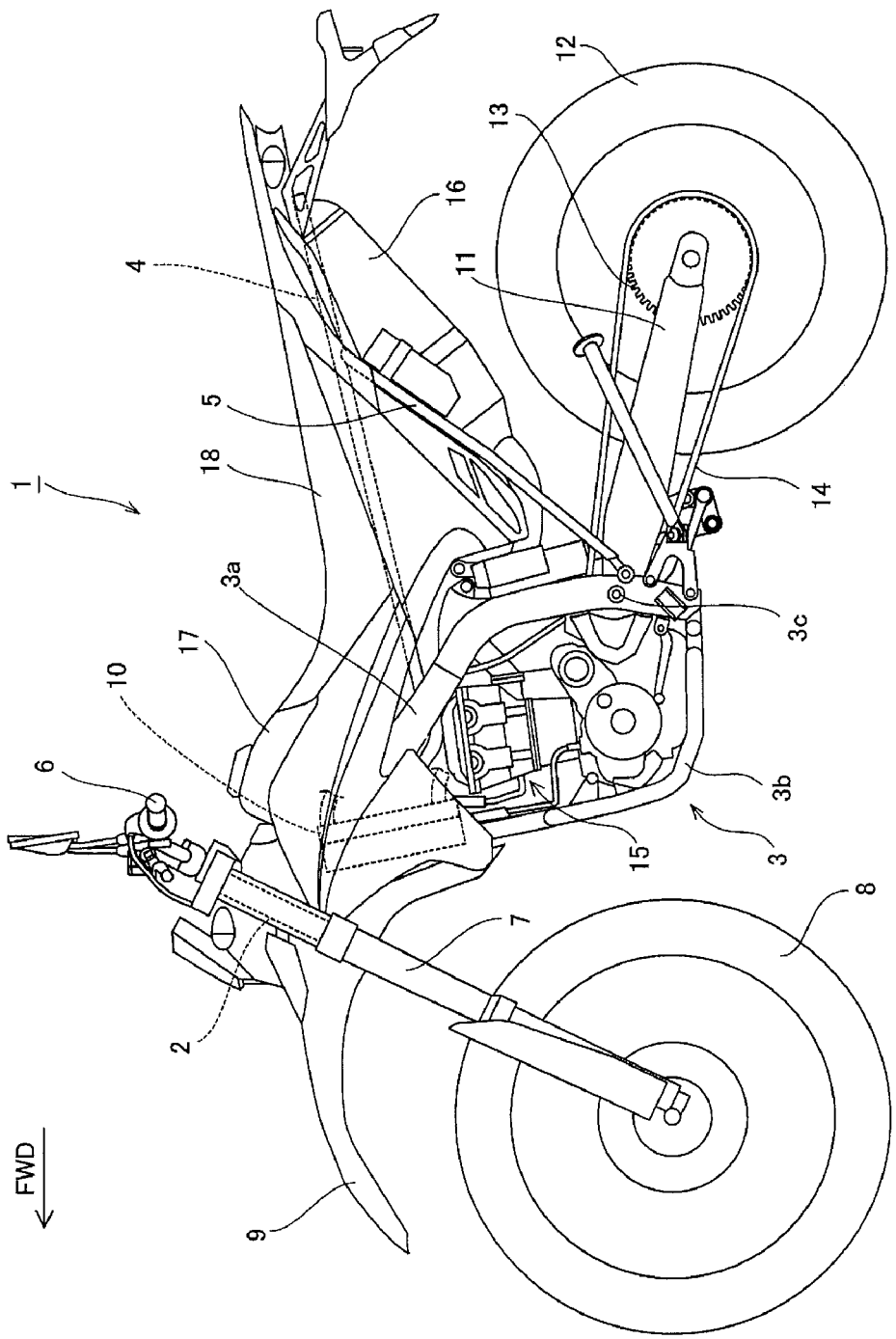
FIG. 1 is a side view showing the entire structure of a motorcycle provided with an engine in accordance with an embodiment of the present invention.

The description of various reference numerals and symbols in the drawings may be set forth in accordance with one or more embodiments, for example, as follows: 1: motorcycle, 15: engine (internal combustion engine), 20: cylinder head, 20*f*: umbrella part, 21: cylinder head cover, 21*a*: chain case part, 21*b*: gas passage, 21*c*: front passage (first passage), 21*d*: rear passage (second passage), 21*e*: intermediate passage (third passage), 21*g*: partition wall, 22: crankcase, 25: intake valve, 26: exhaust valve, 29: cam chain, 30: ignition plug, 30*a*: plug part, 30*b*: plug cap, 31: plate member, 31*a*: gas flow-in port, 31*b*: shield part, 34*a*: cam part, FWD: direction of arrow FWD (predetermined direction), L: direction of arrow L (direction crossing predetermined direction), and R: direction of arrow R (direction crossing predetermined direction).

Embodiments of the present invention and their advantages are best understood by referring to the detailed description that follows. It should be appreciated that like reference numerals are used to identify like elements illustrated in one or more of the figures.

DETAILED DESCRIPTION

FIG. 1 is a side view showing the entire structure of a motorcycle (vehicle) provided with an engine (internal combustion engine) in accordance with an embodiment of the present invention. FIGS. 2 to 10 illustrate in detail, in accordance with one or more embodiments, the structure of the engine in accordance with the embodiment shown in FIG. 1. In this embodiment, a motorcycle is described as an example of a vehicle for an embodiment of the present invention. In the drawings, the arrow FWD indicates the forward running direction of the motorcycle. First, an engine 15 in accordance with this embodiment and a motorcycle 1 provided with the engine 15 are described with reference to FIGS. 1 to 10.

In the motorcycle 1 provided with the engine (internal combustion engine) 15 in accordance with the embodiment of the present invention, as shown in FIG. 1, a main frame 3 extending longitudinally is disposed at the rear of a head pipe 2. The main frame 3 has an upper frame 3*a* extending rearward from above and a lower frame 3*b* extending downward and then rearward. A backstay 5 is connected between the upper frame 3*a* and the rear part of a seat rail 4. The head pipe 2, the main frame 3, the seat rail 4, and the backstay 5 constitute a vehicle body frame.

Handlebars 6 are rotatably attached to the top of the head pipe 2. A pair of front forks 7 having a suspension for absorbing vertical shock is disposed below the handlebars 6. A front wheel 8 is rotatably mounted at the lower end of the front forks 7. A front fender 9 is disposed above the front wheel 8. A radiator 10 is disposed at the rear of the front fork 7.

The front end of a swing arm 11 is attached to the rear end of the main frame 3 via a pivot shaft 3c. A rear wheel 12 is rotatably mounted at the rear end of the swing arm 11. A driven sprocket 13 is attached to the rear wheel 12 so as to rotate together with the rear wheel 12. A drive chain 14 is meshed with the driven sprocket 13. The drive chain 14 is configured to be driven by a drive sprocket 56 (see FIG. 3) of the engine 15 to be discussed later. The engine 15 is mounted as interposed between the upper frame 3a and the lower frame 3b of the main frame 3 and inclined toward the direction of the arrow FWD. The engine 15 is an example of the "internal combustion engine" in accordance with an embodiment of the present invention. A muffler 16 is connected to the engine 15. A fuel tank 17 is disposed on top of the main frame 3. A seat 18 is disposed on top of the seat rail 4.

Figure 2:
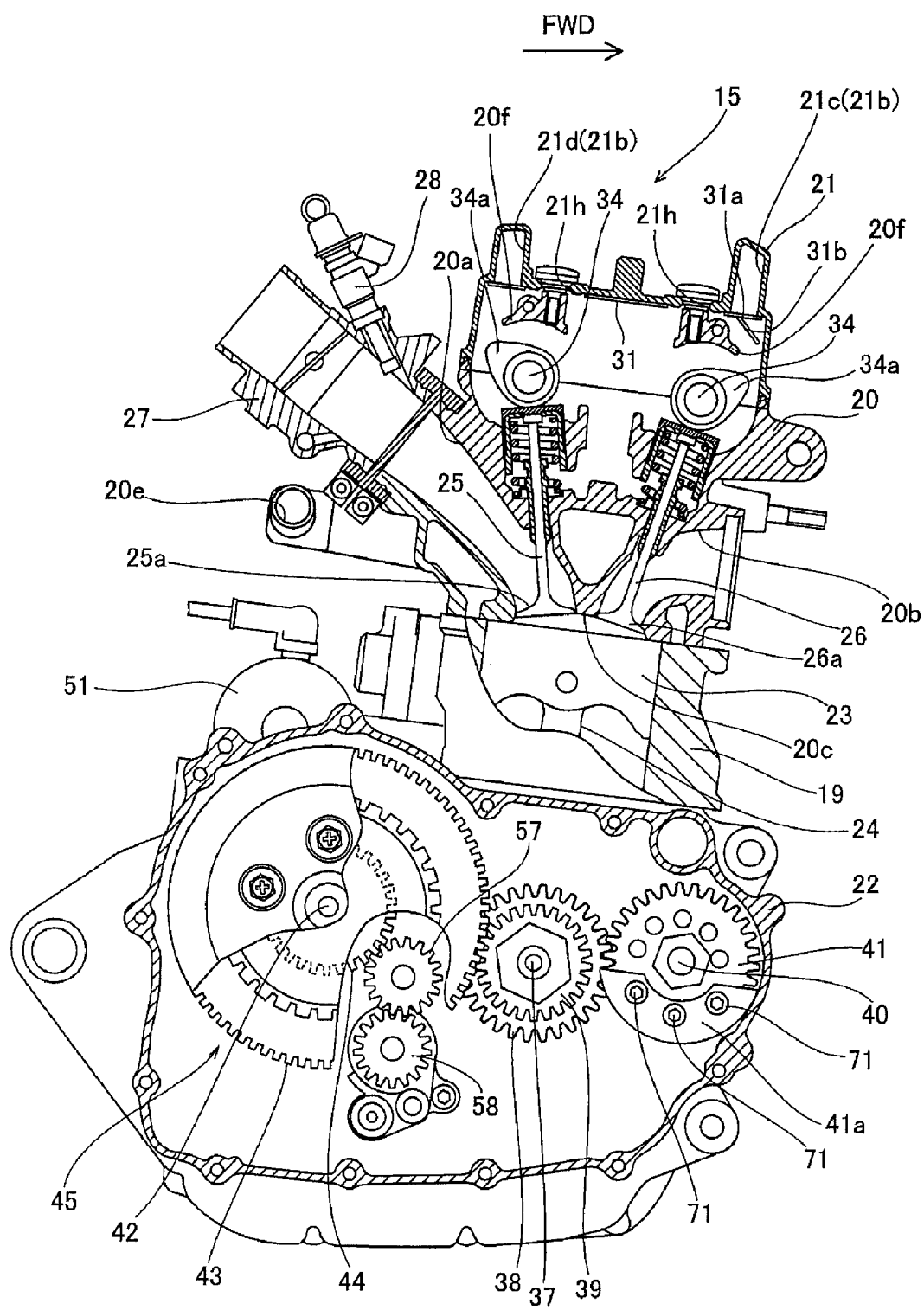
FIG. 2 is a cross sectional view of the engine mounted on the motorcycle in accordance with the embodiment shown in FIG. 1.

As shown in FIG. 2, the engine 15 in accordance with this embodiment includes a cylinder 19, a cylinder head 20, a cylinder head cover 21, and a crankcase 22. A piston 23 is disposed in the cylinder 19 so as to be slidable along its inner peripheral surface. One end of a connecting rod 24 is rotatably attached to the piston 23. The cylinder head 20 is disposed to block an opening of the cylinder 19. The cylinder head 20 is formed with an intake port 20a and an exhaust port 20b. An intake valve 25, made of titanium for example, and an exhaust valve 26, made of steel for example, are disposed in the intake port 20a and the exhaust port 20b, respectively. An umbrella part 25a of the intake valve 25 is formed to have an area about 1.5 times larger, for example, than that of an umbrella part 26a of the exhaust valve 26. A throttle body 27 is connected to the intake port 20a. An injector 28 for injecting fuel into the intake port 20a is attached to the throttle body 27. The intake port 20a is provided to supply a mixture of air and fuel to a combustion chamber 20c of the cylinder head 20. The exhaust port 20b is provided to exhaust a residual gas after combustion from the combustion chamber 20c. The muffler 16 (see FIG. 1) is connected to the exhaust port 20b via an exhaust pipe (not shown).

Figure 3:
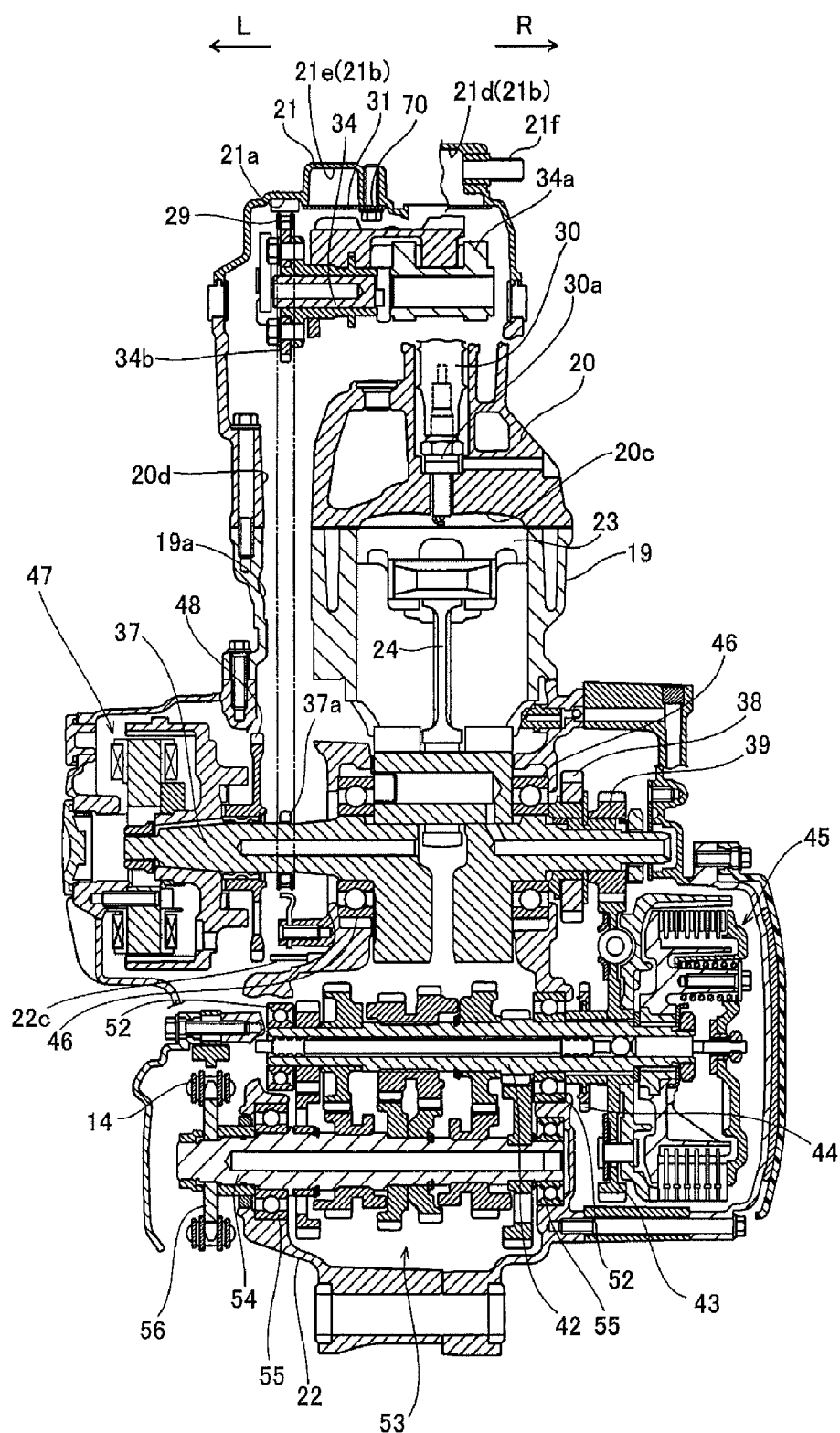
FIG. 3 is a cross sectional view of the engine mounted on the motorcycle in accordance with the embodiment shown in FIG. 1.

As shown in FIG. 3, cam chain chambers 19a and 20d are formed inside the cylinder 19 and the cylinder head 20, respectively, in the direction of the arrow L. A cam chain 29 is disposed in the cam chain chambers 19a and 20d. The cam chain chambers 19a and 20d are provided to connect the crankcase 22 and the cylinder head cover 21. This allows blow-by gas (fuel gas containing oil for lubrication) remaining inside the crankcase 22, which has entered into the crankcase 22 from a gap between the piston 23 and the inner peripheral surface of the cylinder 19, to flow through to the cylinder head cover 21 side (upper side) via the cam chain chambers 19a and 20d.

Figure 4:
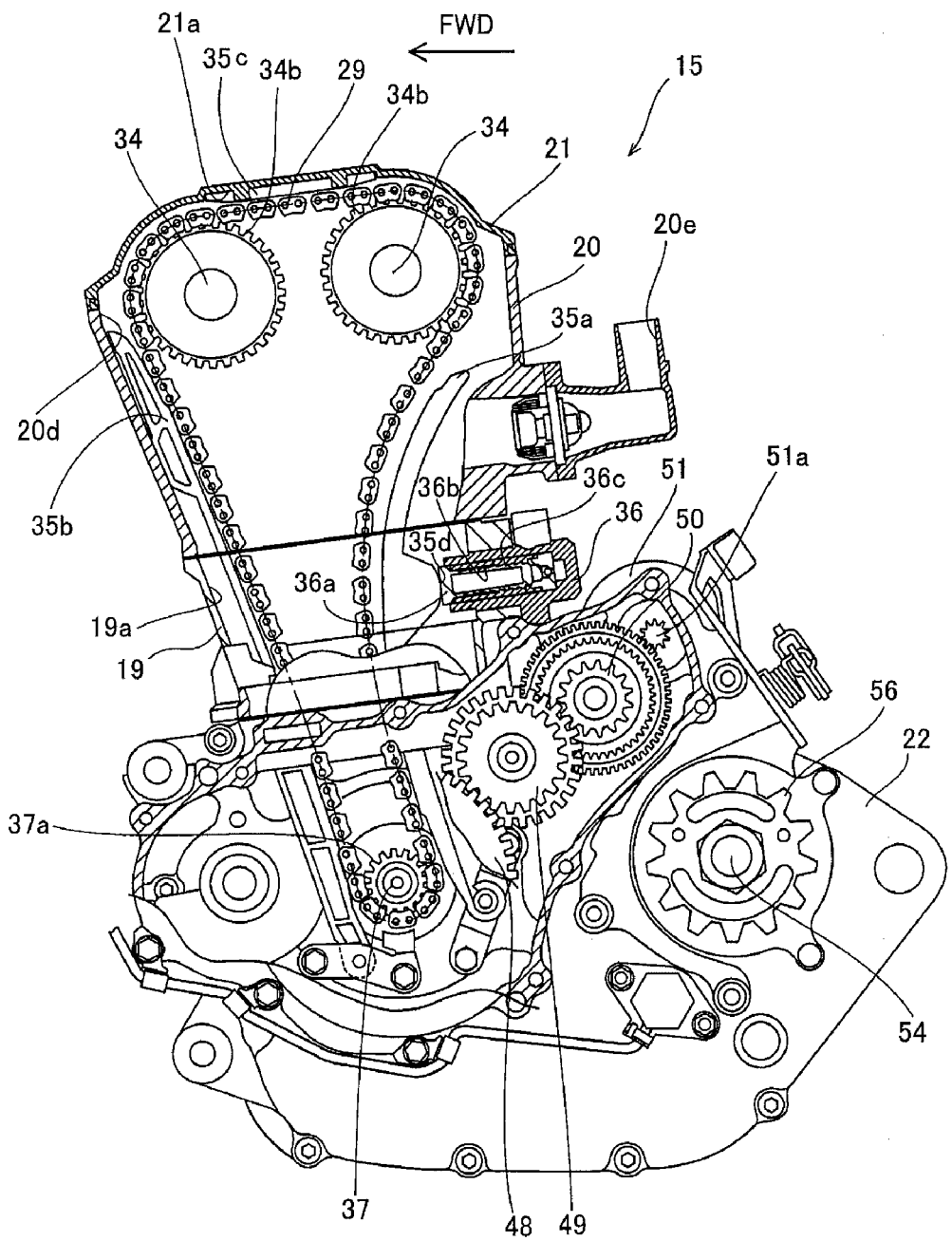
FIG. 4 is a cross sectional view of the engine mounted on the motorcycle in accordance with the embodiment shown in FIG. 1.

As shown in FIGS. 2 and 4, a drain port 20e is provided in the rear of the cylinder head 20 (in the direction opposite to the direction of the arrow FWD). The drain port 20e returns coolant warmed by the engine 15 to the radiator 10 (see FIG. 1) via a hose (not shown). The drain port 20e is disposed in the direction of the arrow L (see FIG. 3) with respect to the intake port 20a (see FIG. 2). Also, the drain port 20e is disposed in the direction of the arrow R (see FIG. 3) with respect to the cam chain 29 (see FIG. 4). In other words, the drain port 20e is provided between the intake port 20a (see FIG. 2) and the cam chain 29 (see FIG. 4).

Figure 5:
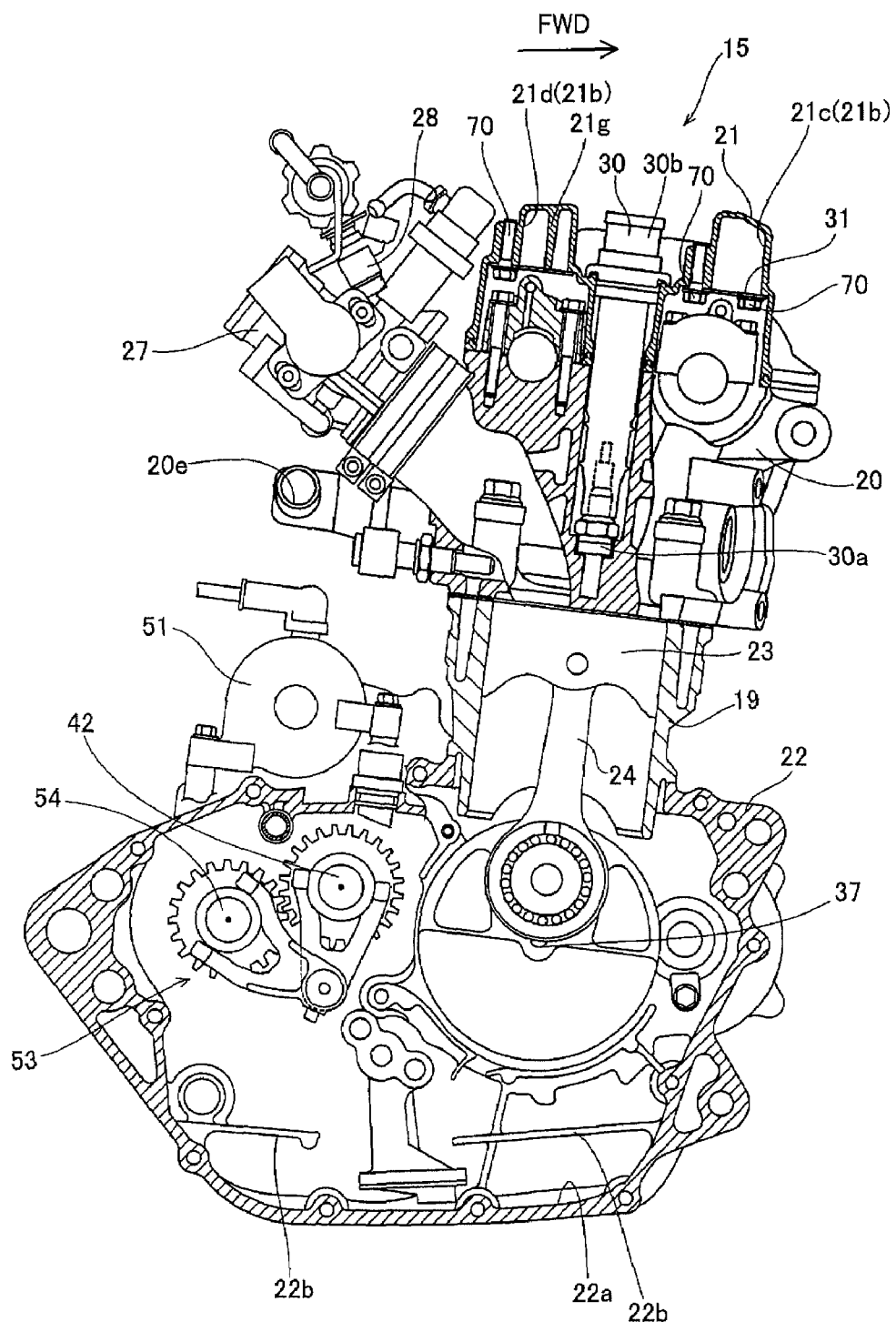
FIG. 5 is a cross sectional view of the engine mounted on the motorcycle in accordance with the embodiment shown in FIG. 1.

As shown in FIG. 5, the cylinder head cover 21, made of magnesium alloy for example, is attached on top of the cylinder head 20 so as to cover the cylinder head 20. An ignition plug 30 is disposed at an upper part (outer side) of the cylinder head cover 21. Specifically, as shown in FIGS. 3 and 5, a plug part 30a of the ignition plug 30 is inserted into the cylinder head 20 such that its lower end projects into an upper part of the combustion chamber 20c (see FIG. 3). Also, as shown in FIG. 5, a plug cap 30b covering the plug part 30a is engaged with the cylinder head cover 21 as projecting from the top of the cylinder head cover 21.

Figure 6:
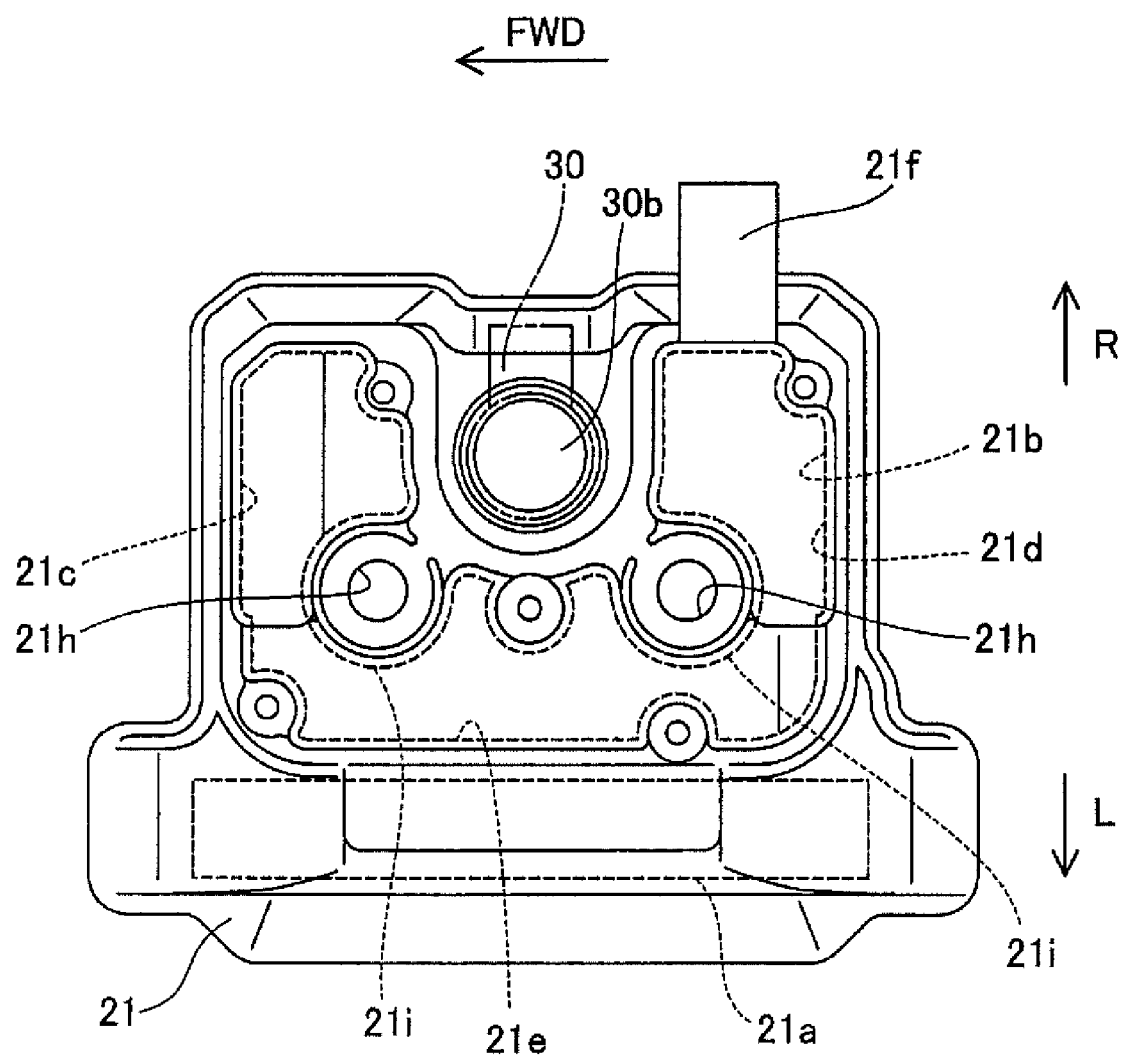
FIG. 6 is a plan view showing the structure of the vicinity of a cylinder head cover of the engine mounted on the motorcycle in accordance with the embodiment shown in FIG. 1.

As shown in FIGS. 3 and 6, the cylinder head cover 21 is provided with a chain case part 21a covering an area above the cam chain chamber 20d (see FIG. 3). The chain case part 21a is integrally formed with the cylinder head cover 21 at an end of the cylinder head cover 21 in the direction of the arrow L. The chain case part 21a is formed to extend in the fore-and-aft direction (predetermined direction) as viewed from the insertion side of the ignition plug 30.

Figure 7:
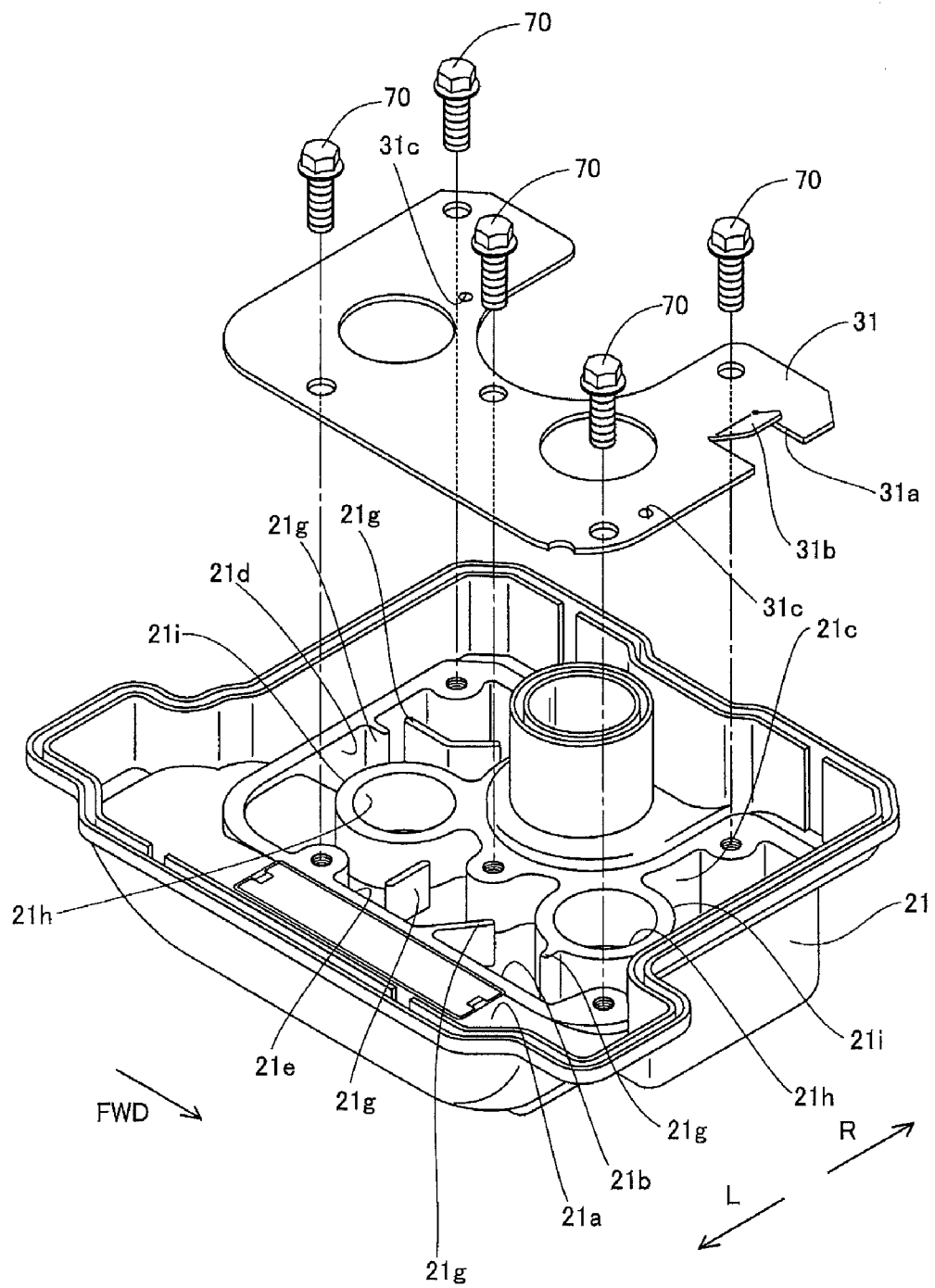
FIG. 7 is an exploded perspective view showing the structure of the vicinity of the cylinder head cover of the engine mounted on the motorcycle in accordance with the embodiment shown in FIG. 1.

In accordance with an embodiment, as shown in FIGS. 6 and 7, the cylinder head cover 21 is formed with a gas passage 21b. The gas passage 21b is formed in such a U-shape as to surround (e.g., at least partially surround on three sides) the plug cap 30b of the ignition plug 30 (see FIG. 6) as viewed from the insertion side of the ignition plug 30. The gas passage 21b is provided to allow blow-by gas with oil mixed therein which has ascended from the crankcase 22 (see FIG. 3) via the cam chain chambers 19a and 20d (see FIG. 3) to flow therethrough, and to separate the oil from the blow-by gas. The gas passage 21b is integrally formed in the cylinder head cover 21. The upper and side surfaces of the gas passage 21b are constituted by inner surfaces of the cylinder head cover 21.

In accordance with an embodiment, as shown in FIGS. 5 and 7, a plate member 31, made of aluminum alloy for example, is attached to the lower side of the cylinder head cover 21. Specifically, the plate member 31 is fixed using five screw members 70 to cover the lower side of the gas passage 21b formed in the cylinder head cover 21. As shown in FIG. 5, the plate member 31 constitutes the bottom of the gas passage 21b.

Figure 8:
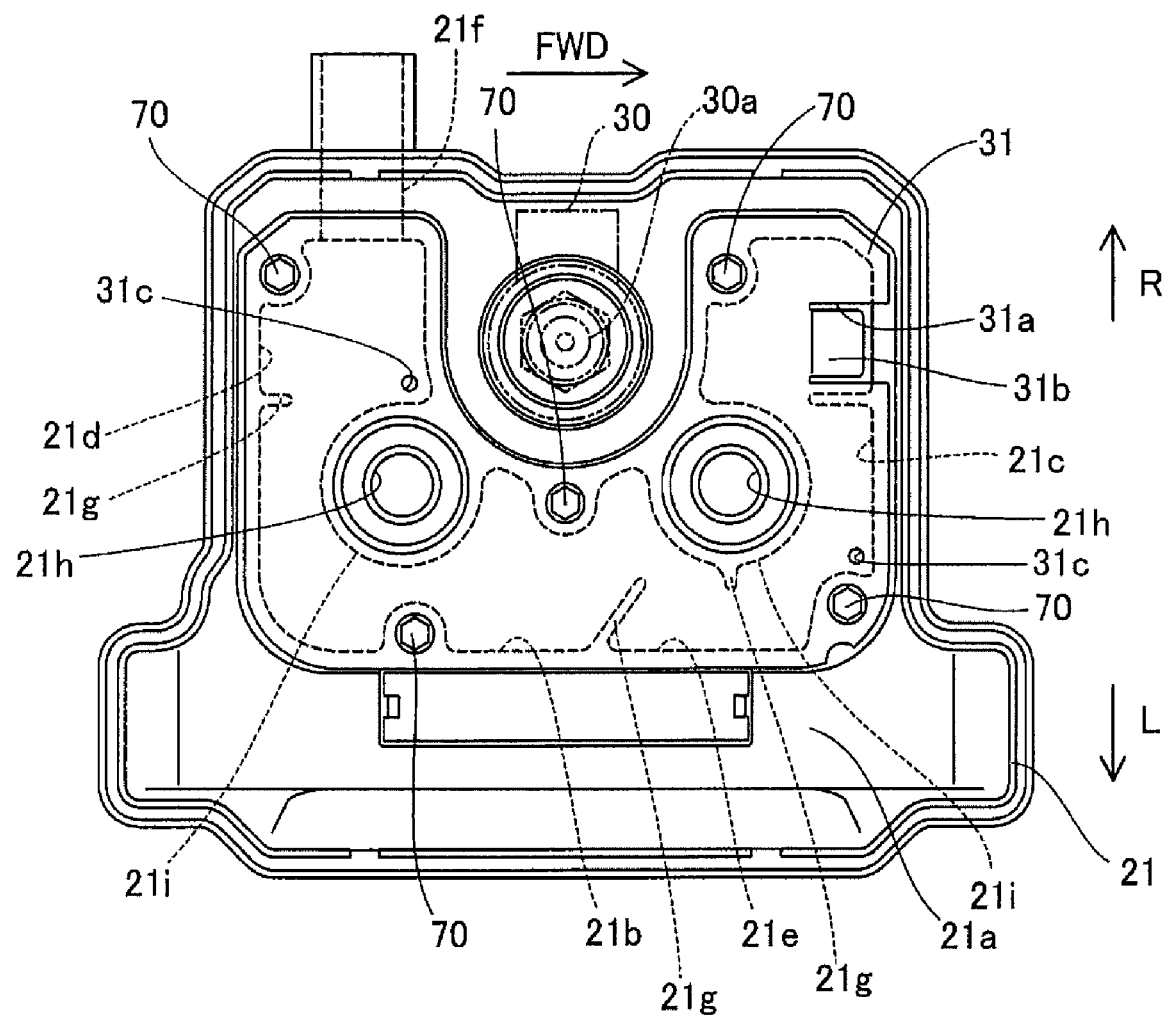
FIG. 8 is a bottom view showing the structure of the vicinity of the cylinder head cover of the engine mounted on the motorcycle in accordance with the embodiment shown in FIG. 1.

In accordance with an embodiment, as shown in FIGS. 7 and 8, the gas passage 21b includes: a front passage 21c and a rear passage 21d extending in the direction of the arrow L and the arrow R (a direction crossing the predetermined direction) and spaced a predetermined gap apart from each other so as to interpose the ignition plug 30 (see FIG. 8) therebetween; and an intermediate passage 21e coupling respective parts of the front passage 21c and the rear passage 21d on a side of the chain case part 21a (in the direction of the arrow L). The front passage 21c is an example of the "first passage" in accordance with an embodiment of the present invention, and the rear passage 21d is an example of the "second passage" in accordance with an embodiment of the present invention. The intermediate passage 21e is an example of the "third passage" in accordance with an embodiment of the present invention.

Figure 9:
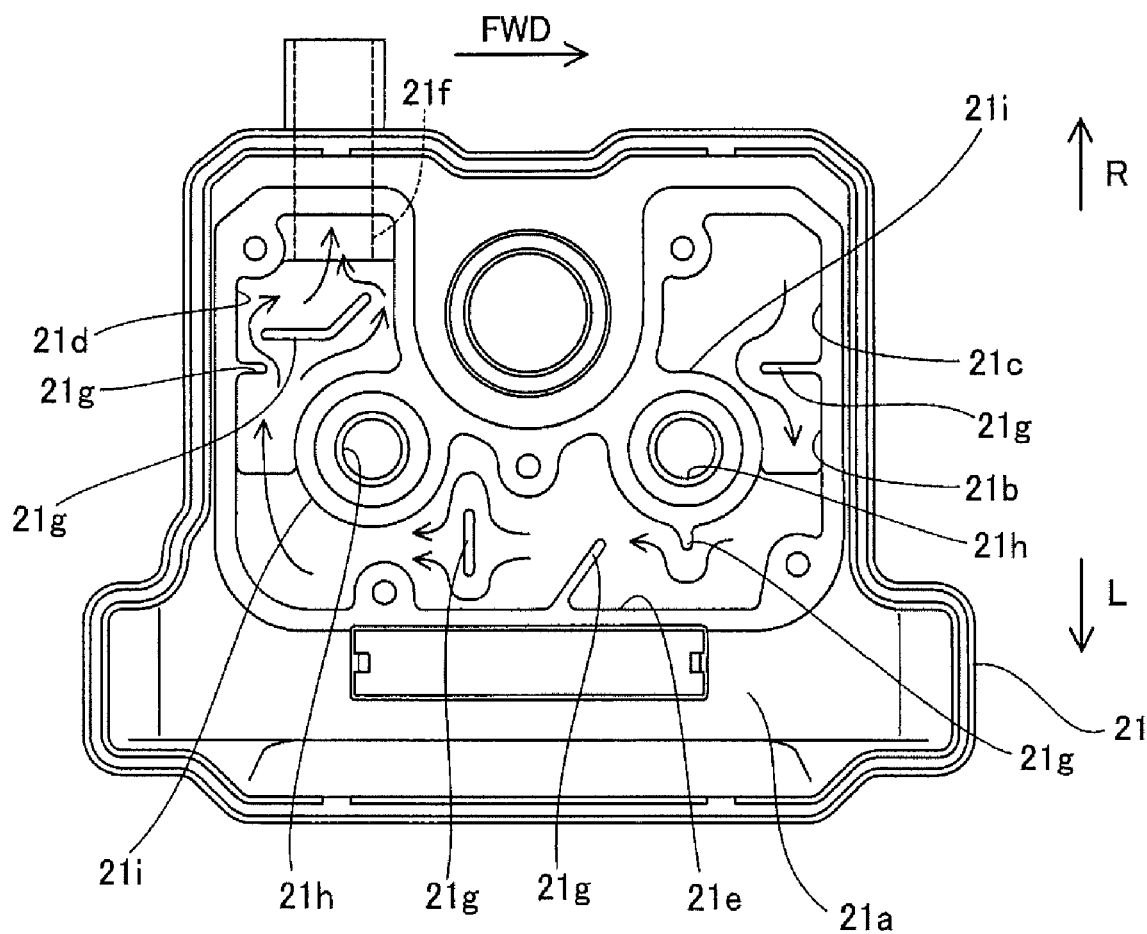
FIG. 9 is a bottom view showing the structure of the cylinder head cover of the engine mounted on the motorcycle in accordance with the embodiment shown in FIG. 1.

In accordance with an embodiment, as shown in FIGS. 7 and 8, a gas flow-in port 31a is formed in a lower part of the front passage 21c on a side opposite to the chain case part 21a (in the direction of the arrow R). The gas flow-in port 31a is formed in the plate member 31 constituting the bottom of the gas passage 21b, and configured to allow blow-by gas to flow into the front passage 21c. As shown in FIG. 9, the front passage 21c is configured to allow blow-by gas, which has flowed in from the gas flow-in port 31a (see FIG. 8), to flow therethrough in the direction of the arrow L from the vicinity of an end in the direction of the arrow R. As shown in FIGS. 7 and 8, the gas flow-in port 31a is provided with a shield part 31b formed by bending a part of the plate member 31 downward. The shield part 31b has a function of restraining oil splashed below the gas flow-in port 31a, as a cam part 34a (see FIG. 2) to be discussed later or the like rotates, from entering from the gas flow-in port 31a into the front passage 21c.

In accordance with an embodiment, as shown in FIG. 8, an end of the intermediate passage 21e in the direction of the arrow FWD (front side) is coupled to an end of the front passage 21c in the direction of the arrow L. The intermediate passage 21e is formed adjacent to the chain case part 21a in the direction of the arrow R, and extends in the fore-and-aft direction (predetermined direction). The intermediate passage 21e is configured to allow blow-by gas to flow therethrough from the front passage 21c side (front side) to the rear passage 21d side (rear side).

Figure 10:
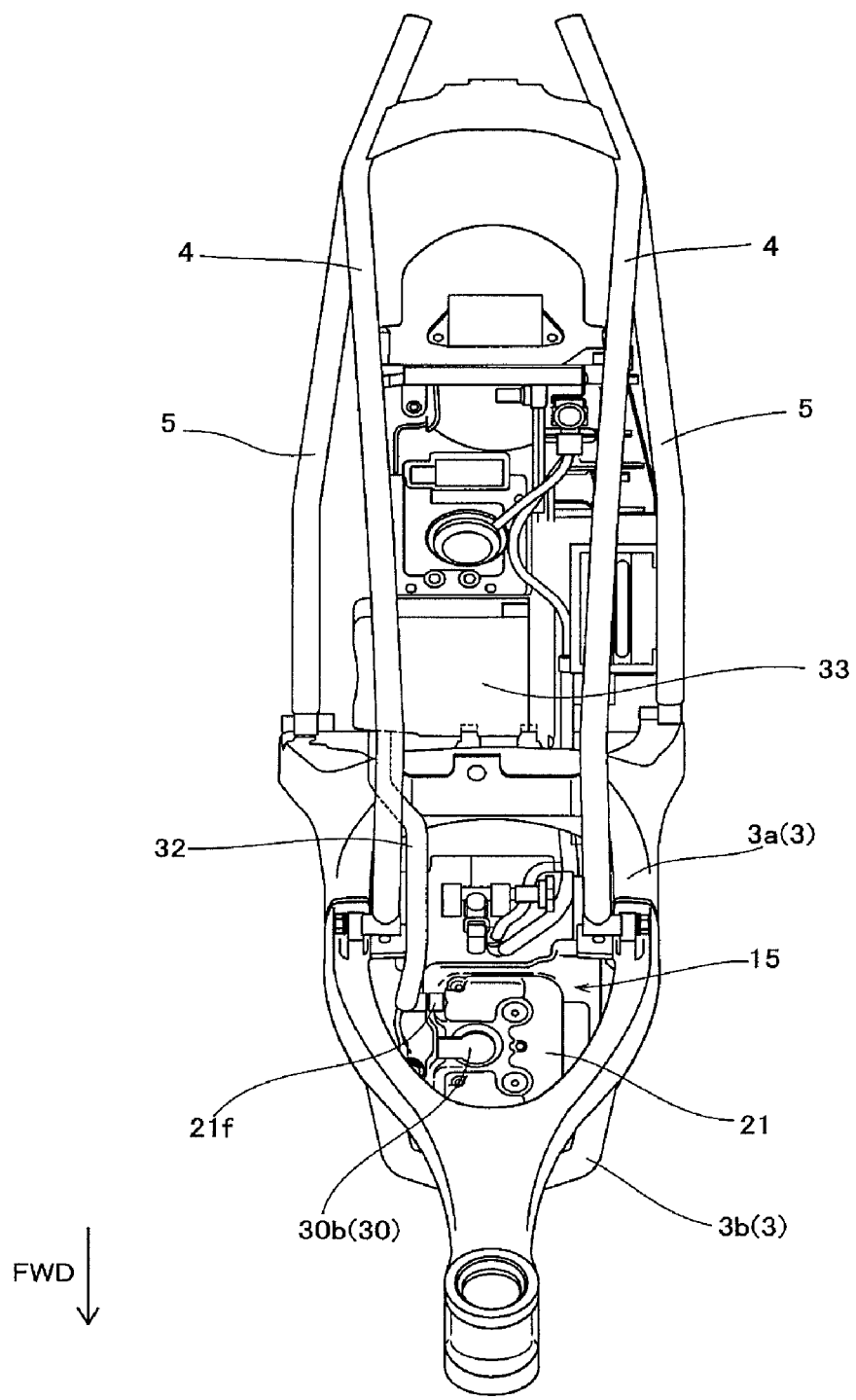
FIG. 10 is a plan view illustrating the structure of the motorcycle in accordance with the embodiment shown in FIG. 1.

In accordance with an embodiment, an end of the rear passage 21d in the direction of the arrow L is coupled to the rear end of the intermediate passage 21e. As shown in FIGS. 6 and 9, a discharge port 21f is formed at an end of the rear passage 21d in the direction of the arrow R. The discharge port 21f discharges blow-by gas to the outside of the gas passage 21b. That is, the rear passage 21d is configured to allow blow-by gas to flow therethrough from a side in the direction of the arrow L to a side in the direction of the arrow R and to be discharged from the discharge port 21f, as shown in FIG. 9. As shown in FIG. 10, one end of a hose 32 is attached to the discharge port 21f, and the other end of the hose 32 is connected to an air cleaner 33. This allows blow-by gas discharged from the discharge port 21f to the outside of the gas passage 21b (see FIG. 6) to flow via the hose 32 into the air cleaner 33 with oil sufficiently separated from the blow-by gas.

In accordance with an embodiment, as shown in FIGS. 7 and 9, a plurality of partition walls 21g are formed in the gas passage 21b. The partition walls 21g are integrally formed with the cylinder head 21 to project inside the gas passage 21b. The partition walls 21g have a function of restraining an increase in the flow rate of blow-by gas flowing through the gas passage 21b. This enables effective separation of oil from the blow-by gas.

In accordance with an embodiment, as shown in FIG. 2, the engine 15 is mounted as inclined toward the direction of the arrow FWD (front side) as described above. Therefore, the gas passage 21b of the cylinder head cover 21 is disposed to be inclined downward toward the front passage 21c (front side) where blow-by gas flows in. That is, the plate member 31 which constitutes the bottom of the gas passage 21b is disposed to be inclined downward toward the front. This allows the oil separated from the blow-by gas to be easily discharged to the outside of the gas passage 21b via the gas flow-in port 31a provided in the front passage 21c, making it possible to restrain the oil from remaining in the gas passage 21b. A plurality of oil drain holes 31c is formed in the plate member 31. This also allows the oil separated from the blow-by gas to be easily discharged to the outside of the gas passage 21b via the plurality of oil drain holes 31c, making it possible to restrain the oil from remaining in the gas passage 21b.

As shown in FIG. 7, two attachment holes 21h are formed in the cylinder head cover 21. The attachment holes 21h are used to attach the cylinder head cover 21 to umbrella parts 20f (see FIG. 2) of the cylinder head 20 to be discussed later. A wall 21i is formed around each attachment hole 21h. The wall 21i has a function of restraining an increase in the flow rate of blow-by gas flowing through the gas passage 21b. This enables separation of oil from the blow-by gas.

As shown in FIG. 2, a pair of camshafts 34 is provided below the cylinder head cover 21. The camshafts 34 are each provided with a cam part 34a for operating the intake valve 25 and the exhaust valve 26, respectively. As shown in FIG. 3, the cam chain 29 described above is meshed with a gear 34b of each camshaft 34. The cam chain 29 passes through the cam chain chambers 19a and 20d to be meshed with a gear 37a of a crankshaft 37 to be discussed later. The camshafts 34 are configured to rotate as the crankshaft 37 rotates.

In accordance with an embodiment, as shown in FIG. 2, an umbrella part 20f is provided above each of the cam parts 34a. The umbrella part 20f on the exhaust port 20b side (in the direction of the arrow FWD), of the pair of umbrella parts 20f, is provided below the front passage 21c where the gas flow-in port 31a is provided and has a function of restraining oil from being splashed upward as the cam part 34a rotates.

As shown in FIG. 4, in the cam chain chambers 19a and 20d are disposed cam chain guides 35a and 35b and a guide stopper 35c along the outer periphery of the cam chain 29. The cam chain guides 35a and 35b and the guide stopper 35c have a function of restraining the cam chain 29 from slipping off from the gears 34b of the camshafts 34 and the gear 37a of the crankshaft 37.

A cam chain tensioner 36 is attached to the rear side of the cam chain chamber 19a by being inserted from an outer side of the cylinder 19. The cam chain tensioner 36 is configured such that a pressing part 36a thereof presses a rear part 35d of the cam chain guide 35a. The cam chain tensioner 36 is configured to be connected to oil piping (not shown) so that the pressing part 36a presses the rear part 35d of the cam chain guide 35a by hydraulic pressure. This enables the cam chain 29 to maintain a predetermined tension even if the cam chain 29 is elongated due to deterioration over time. A meshing part 36c is formed in the pressing part 36a. The meshing part 36c is meshed with a meshing part 36b formed in the main part of the cam chain tensioner 36.

As shown in FIG. 5, the crankcase 22 is attached to the bottom of the cylinder 19. An oil pan 22a is provided at the bottom of the crankcase 22. The oil pan 22a reserves oil for lubricating the inside of the engine 15. A wall 22b is provided above the oil pan 22a. The wall 22b restrains the oil reserved in the oil pan 22a from splashing.

As shown in FIG. 2, inside the crankcase 22 are disposed: a crankshaft 37; a first crank gear 38 and a second crank gear 39 that rotate about the crankshaft 37; a balancer shaft 40; a balancer gear 41 that rotates about the balancer shaft 40; a main shaft 42; a driven gear 43 that rotates about the main shaft 42; an oil pump drive gear 44 attached to the driven gear 43 to rotate together with the driven gear 43; and a clutch mechanism 45 attached to the main shaft 42.

As shown in FIG. 3, the other end of the connecting rod 24 is rotatably attached to the crankshaft 37. In other words, the crankshaft 37 is configured to rotate as the piston 23 slides relative to the cylinder 19. The crankshaft 37 is disposed in the crankcase 22 so as to be perpendicular to the running direction (the direction of the arrow FWD) (see FIGS. 1 and 2). The crankshaft 37 is rotatably supported by a pair of bearings 46 mounted in the crankcase 22. The second crank gear 39 is fixed to the crankshaft 37 in the vicinity of one end thereof (in the direction of the arrow R), and configured to rotate together with the crankshaft 37. The first crank gear 38 is fixed to the crankshaft 37 adjacent to the second crank gear 39 in the direction of the arrow L, and configured to rotate together with the crankshaft 37.

A generation device 47 is attached to the other end of the crankshaft 37 (in the direction of the arrow L). The generation device 47 is configured to generate electricity along with the rotation of the crankshaft 37. A starter gear 48 is fixed to the crankshaft 37 adjacent to the generation device 47 in the direction of the arrow R. As shown in FIG. 4, the starter gear 48 is connected to a drive gear 51a of a starter motor 51 via intermediate gears 49 and 50. As shown in FIG. 3, a gear 37*a* is provided on the crankshaft 37 at a side of the starter gear 48 in the direction of the arrow R. The cam chain 29 is meshed with the gear 37*a*. A restriction part 22*c* is integrally formed with the crankcase 22 at a side of the starter gear 48 in the direction of the arrow R. The restriction part 22*c* restricts movement of the starter gear 48 along the crankshaft 37 in the direction of the arrow R.

As shown in FIG. 2, the balancer gear 41 is configured to be meshed with the first crank gear 38. The balancer gear 41 is configured to rotate together with the balancer shaft 40. A balancer 41*a*, made of steel for example, is attached to the balancer gear 41. The balancer 41*a* has an arcuate shape, and is fixed to a flat part of the balancer gear 41 by three screw members 71. The balancer 41*a* is attached to the balancer gear 41 so as to be positioned at the lower part of the flat part of the balancer gear 41 when the piston 23 is positioned at the top dead center. Since the balancer gear 41 rotates a half turn as the first crank gear 38 rotates a half turn, the balancer 41*a* is moved to be positioned at the upper part of the flat part of the balancer gear 41 when the piston 23 is positioned at the bottom dead center.

The driven gear 43 is meshed with the second crank gear 39. The driven gear 43 is configured to have a larger diameter than that of the second crank gear 39. That is, the driven gear 43 is configured to rotate at a speed reduced from the rotational speed of the second crank gear 39. The driving force transmitted to the driven gear 43 is transmitted to the main shaft 42 via the clutch mechanism 45. The clutch mechanism 45 has a function of intermittently transmitting the driving force transmitted to the driven gear 43 to the main shaft 42. As shown in FIG. 3, the main shaft 42 is rotatably supported by a pair of bearings 52 mounted in the crankcase 22. The driving force transmitted to the main shaft 42 is transmitted to a drive shaft 54 via a transmission mechanism 53. The drive shaft 54 is rotatably supported by a pair of bearings 55 mounted in the crankcase 22. A drive sprocket 56 is attached to an end of the drive shaft 54 in the direction of the arrow L. This allows the driving force transmitted to the drive shaft 54 to be transmitted to the rear wheel 12 (see FIG. 1) via the drive chain 14.

As shown in FIGS. 2 and 3, the oil pump drive gear 44, made of resin for example, is engaged on a side of the driven gear 43 in the direction of the arrow L. The oil pump drive gear 44 is configured to rotate together with the driven gear 43. An intermediate gear 57, made of resin for example, is meshed with the oil pump drive gear 44. The intermediate gear 57 is rotated as the oil pump drive gear 44 rotates. An oil pump gear 58, made of resin for example, is meshed with the intermediate gear 57. The oil pump gear 58 is rotated as the intermediate gear 57 rotates. That is, the oil pump gear 58 is configured to be rotated via the intermediate gear 57 as the oil pump drive gear 44 rotates.

In accordance with an embodiment, the cylinder head cover 21 is provided with the gas passage 21*b* formed in such a U-shape as to surround the plug cap 30*b* of the ignition plug 30 as viewed from the insertion side of the ignition plug 30 as described above. Therefore, the gas passage 21*b* can be formed using a larger part of the cylinder head cover 21 as viewed from the insertion side of the ignition plug 30 than the case where the gas passage 21*b* were formed in an L-shape as viewed from the insertion side of the ignition plug 30, increasing the length of the gas passage 21*b*. This makes it possible to provide the cylinder head cover 21 with a gas passage having a length long enough to separate oil from blow-by gas.

In accordance with an embodiment, the gas passage 21*b* is provided with: the front passage 21*c* and the rear passage 21*d* extending in a direction (the direction of the arrow L and the arrow R) crossing a predetermined direction (the direction of the arrow FWD) and spaced a predetermined gap apart from each other so as to interpose the ignition plug 30 therebetween; and the intermediate passage 21*e* coupling respective parts of the front passage 21*c* and the rear passage 21*d* on a side of the chain case part 21*a* and extending in the predetermined direction (the direction of the arrow FWD). Therefore, it is easy to provide the cylinder head cover 21 with the gas passage 21*b* in a U-shape as viewed from the insertion side of the ignition plug 30.

In accordance with an embodiment, the gas passage 21*b* of the cylinder head cover 21 is disposed to be inclined downward toward the front passage 21*c* (in the direction of the arrow FWD) where blow-by gas flows in. Therefore, oil separated from the blow-by gas inside the gas passage 21*b* is allowed to flow toward the front passage 21*c*, and be discharged to the outside of the gas passage 21*b* from the gas flow-in port 31*a* which is provided in a lower part of the front passage 21*c* on a side opposite to the chain case part 21*a* (in the direction of the arrow R).

In accordance with an embodiment, the gas flow-in port 31*a* is provided with the shield part 31*b* for restraining oil splashed below the gas flow-in port 31*a* from entering into the front passage 21*c*. Therefore, the shield part 31*b* can easily restrain oil splashed in the vicinity of the gas flow-in port 31*a* from entering into the front passage 21*c* from the gas flow-in port 31*a*.

In accordance with an embodiment, the umbrella part 20*f* is provided between the cam part 34*a* and the gas flow-in port 31*a* to restrain oil from being splashed upward as the cam part 34*a* rotates. Therefore, not only the shield part 31*b* but also the umbrella part 20*f* can restrain oil, splashed upward as the cam part 34*a* rotates, from entering into the front passage 21*c* from the gas flow-in port 31*a*, further restraining oil from entering into the front passage 21*c*.

It should be understood that the embodiments disclosed herein are construed to be illustrative in all respects rather than restrictive. The scope of the present invention is defined by the scope of the claims rather than by the description of one or more of the above embodiments, and includes all modifications falling within the scope of the claims and equivalents thereof.

For example, in accordance with an embodiment, a motorcycle is described as an example of the vehicle including an internal combustion engine. However, the present invention is not limited thereto, and may be applied to vehicles provided with an internal combustion engine other than motorcycles, such as bicycles, tricycles, and ATVs (all terrain vehicles).

In accordance with an embodiment, the intermediate passage of the U-shaped gas passage is provided adjacent to the chain case part. However, the present invention is not limited thereto, and the intermediate passage may be provided to overlap the chain case part.

In accordance with an embodiment, the bottom of the gas passage is constituted by the plate member. However, the present invention is not limited thereto, and the bottom of the gas passage may be integrally formed by the cylinder head cover.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An internal combustion engine comprising:
   a crankcase;
   a cylinder head disposed above the crankcase;

a cylinder head cover attached to cover an upper side of the cylinder head;

an ignition plug provided with a plug part inserted into the cylinder head and a plug cap covering the plug part and disposed outside the cylinder head cover; wherein the cylinder head cover includes a substantially U-shaped gas passage arranged so as to surround the plug cap of the ignition plug as viewed from an insertion side of the ignition plug, the gas passage arranged to allow fuel gas containing oil to flow in from the crankcase;

the gas passage includes:
- a first passage and a second passage spaced a predetermined gap apart from each other so as to interpose the ignition plug therebetween; and
- a third passage formed in a predetermined direction and adjacent to the ignition plug to couple respective portions of the first passage and the second passage which extend in a direction crossing the predetermined direction; and
- a gas flow-in port provided in the first passage and disposed away from the third passage to allow the fuel gas containing oil to flow into the gas passage via the first passage from the crankcase;

the gas passage of the cylinder head cover includes a plurality of partition walls provided inside the gas passage;

a first partition wall of the plurality of partition walls extends between the first passage and the third passage and a second partition wall of the plurality of partition walls extends between the second passage and the third passage;

the plurality of partition walls are arranged to restrain an increase in a flow rate of blow-by gas flowing in the first, second, and third passages; and each of the first partition wall and the second partition wall extends around a hole arranged to receive a member to be attached to the cylinder head cover.

2. The internal combustion engine according to claim 1, wherein the cylinder head cover further includes a chain case part provided at an end thereof to extend in the predetermined direction as viewed from the insertion side of the ignition plug, the chain case part covering an area above a cam chain and adjacent to the third passage.

3. The internal combustion engine according to claim 2, further comprising:
a discharge port provided in the second passage and disposed away from the third passage to allow the fuel gas traveling from the first passage and through the third passage to flow out of the gas passage via the second passage; wherein
the gas passage of the cylinder head cover is disposed to be inclined downward toward the gas flow-in port.

4. The internal combustion engine according to claim 3, further comprising:
an air cleaner coupled to the discharge port and arranged to receive the fuel gas from the second passage via the discharge port; wherein
the gas flow-in port is provided with a shield part to restrain oil splashed therebelow from entering into the first passages; and
the gas flow-in port provided in the first passage is disposed on a side of the first passage opposite to a side adjacent to the ignition plug.

5. The internal combustion engine according to claim 4, further comprising:
a plate member provided at a lower side of the cylinder head cover; wherein
a bottom of the gas passage is defined by the plate member.

6. The internal combustion engine according to claim 5, wherein the shield part of the gas flow-in port is integral with the plate member.

7. The internal combustion engine according to claim 4, further comprising:
a cam part disposed below the cylinder head cover to operate an intake valve and an exhaust valve; and
an umbrella part provided between the cam part and the gas flow-in port to restrain oil from being splashed upward as the cam part rotates.

8. The internal combustion engine according to claim 1, wherein the plurality of partition walls are integral with the cylinder head cover.

9. A vehicle comprising the internal combustion engine according to claim 1.

10. A vehicle comprising the internal combustion engine according to claim 2.

11. A vehicle comprising the internal combustion engine according to claim 3.

12. A vehicle comprising the internal combustion engine according to claim 4.

13. A vehicle comprising the internal combustion engine according to claim 5.

14. A vehicle comprising the internal combustion engine according to claim 6.

15. A vehicle comprising the internal combustion engine according to claim 7.

16. A vehicle comprising the internal combustion engine according to claim 8.

* * * * *